March 19, 1935. A. B. OSGOOD 1,994,832
TRAVELING TRIPPING DEVICE AND DUST COLLECTOR
Filed Nov. 14, 1931 3 Sheets-Sheet 1

Inventor
Arthur B. Osgood
By his Attorneys
Merchant & Kilgore

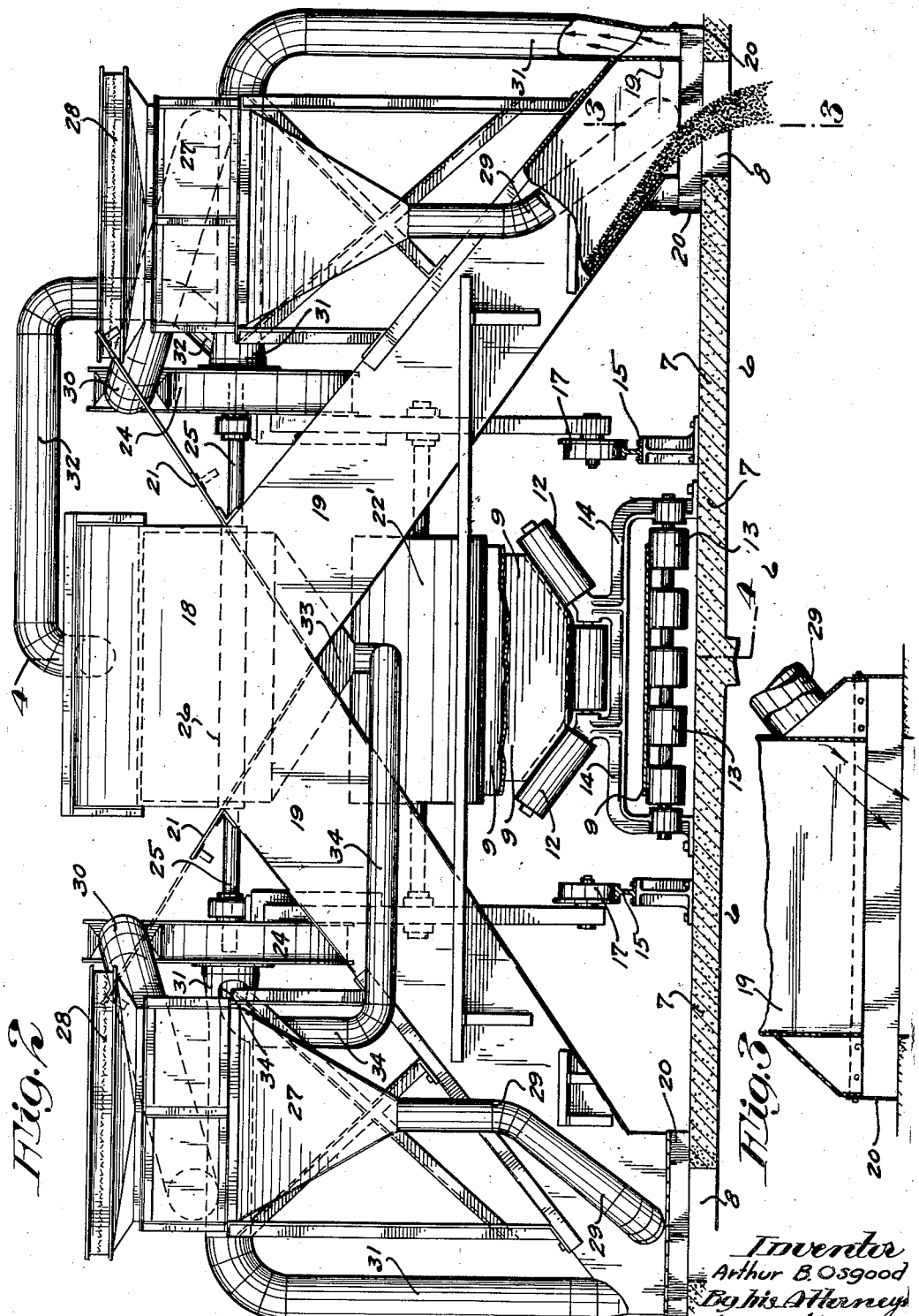

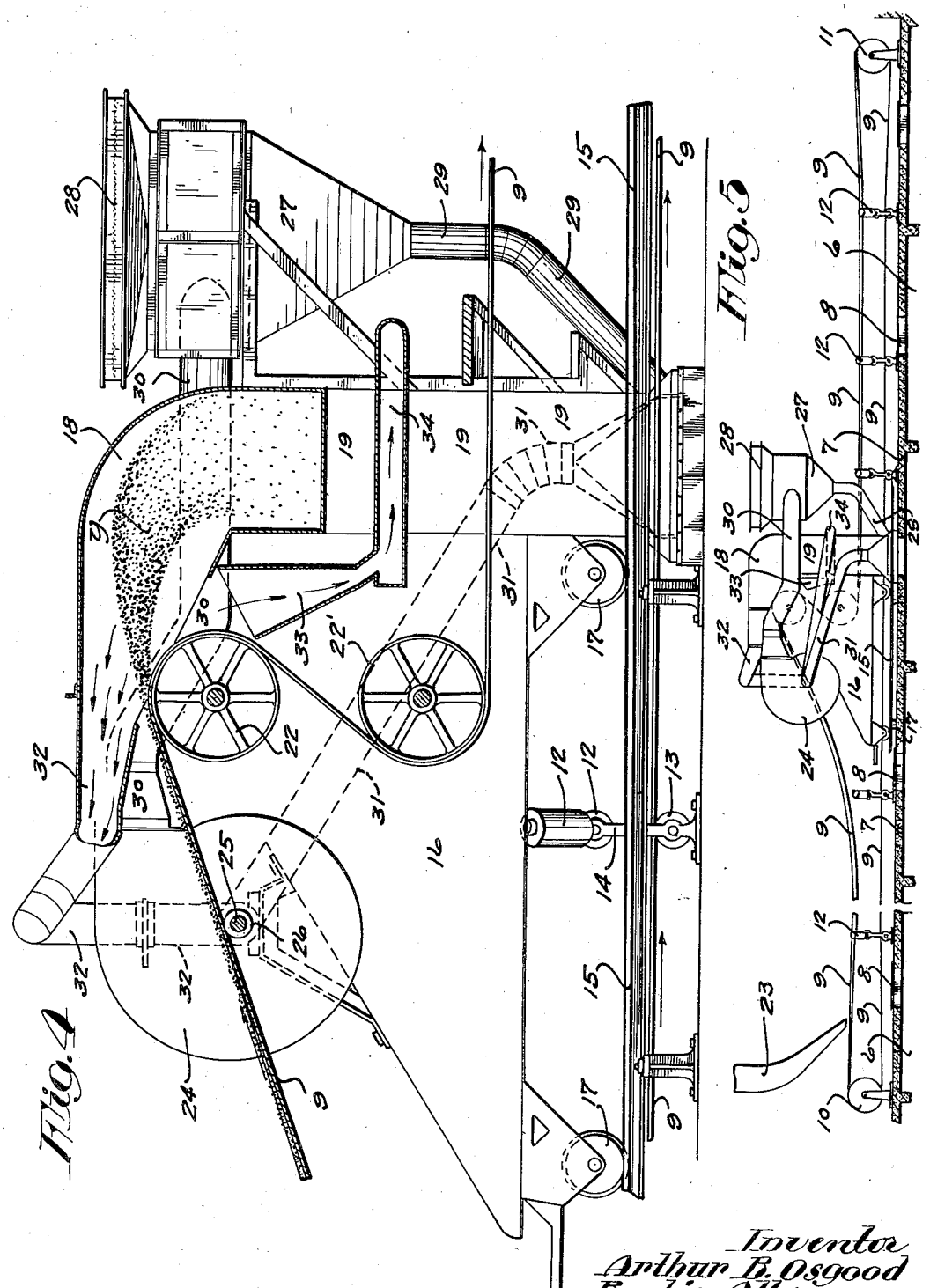

Patented Mar. 19, 1935

1,994,832

UNITED STATES PATENT OFFICE 1,994,832

TRAVELING TRIPPING DEVICE AND DUST COLLECTOR

Arthur B. Osgood, Minneapolis, Minn.

Application November 14, 1931, Serial No. 574,959

3 Claims. (Cl. 209—147)

My invention relates to grain conveyors of the type wherein grain is conveyed by a belt and delivered to various bins under the action of what is known as traveling trippers, and provides dust-collecting apparatus applied in connection with the traveling tripper and arranged to collect dust at various different points where the grain is agitated by its delivery through the tripper and thereby prevent the dust from contaminating the air and the building in which the apparatus is installed. Dust such as thrown into the air from agitated grain as is well known, renders the air highly explosive and, moreover, is very injurious to workmen. It is highly important to keep the dust from getting into the room or building in which the device is operating and this is effectually accomplished in accordance with my invention; but it is not convenient to collect and accumulate dust in connection with the traveling tripper, and hence as a feature of the invention, the dust is discharged with the grain into the receiving bins at the rear point of delivery of the grain into the bins. This re-delivery of the dust into the grain is not objectionable because the grain must later on be subjected to a cleaning action.

A commercial form of the invention is illustrated in the accompanying drawings wherein like characters indicate like parts throughout the several views.

Referring to the drawings:

Fig. 2 is front elevation of parts shown in Fig. 1;

Fig. 3 is a fragmentary section taken on the line 3—3 of Fig. 2;

Fig. 4 is a longitudinal section taken approximately on the line 4—4 of Fig. 2; and Fig. 5 is a diagrammatic side elevation with some parts sectioned showing the complete conveyor belt, a multiplicity of grain storage bins and the traveling tripper.

Figure 1:
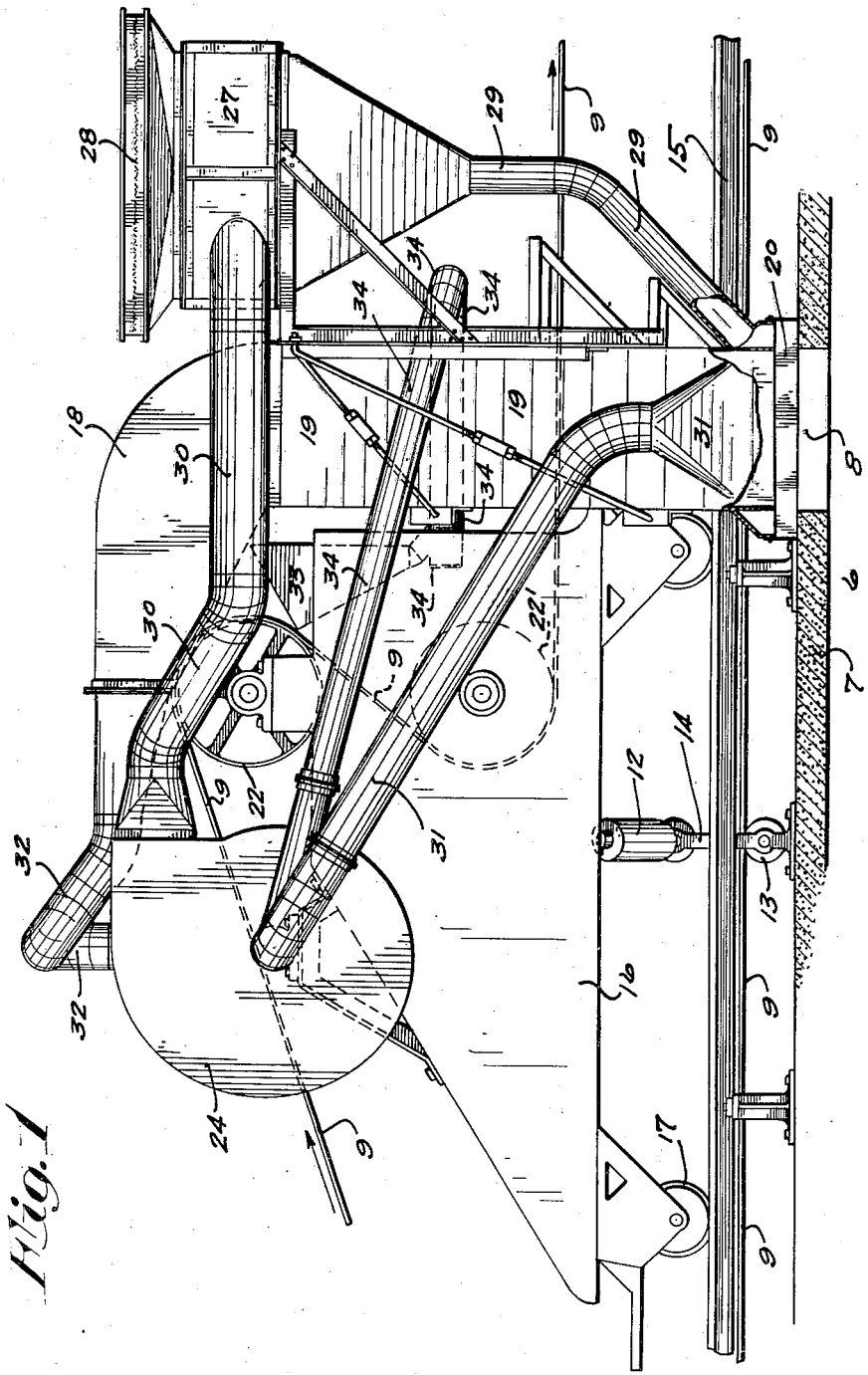
Fig. 1 is a side elevation illustrating the invention applied to the traveling tripper of the character above indicated.

The grain-receiving bins 6 are located below the floor 7 of the working room in which the conveyor is installed, and the said floor is provided with ports or openings 8 that open into the respective bins. The grain conveyor belt 9 runs over local pulleys 10 and 11 and is arranged to run along the floor 7 parallel to and between two rows of receiving ports 8 of adjacent bins. At points between the ports 10 and 11, the top of the belt is arranged to run over converging guide rollers 12 and the return portion of the belt is arranged to run over rollers 13, journaled to roller-supporting brackets 14 secured on the floor 7. For guiding the tripper, parallel rails 15 are suitably supported on the floor 7.

The tripper comprises a truck body 16 having wheels 17 arranged to run on the rails 15. Mounted on the truck frame 16 is a receiving hopper 18 that has reversely inclined or split discharge spouts 19 and arranged to deliver into the two rows of bin ports 8 to form close contact with the floor 7, the delivery ends of the spouts 19 are provided with flexible hoods or flanges 20. In the bottom of the hopper 18 are slidable gates 21 for opening and closing the spouts 19 at will.

Journaled to the sides of the truck body 16 is an upper belt-guiding pulley 22 and a lower belt-guiding pulley 22'. The upper intermediate portion of the conveyor belt 9 is arranged to run over the upper pulley 22 and under the lower pulley 22', as best shown in Fig. 4, by reference to which it will be noted that the upper pulley 22 is so located in respect to the hopper 18 that the grain $y$ delivered from the belt, will, by centrifugal force, be delivered into the said hopper 18. The arrangement so far described in connection with the drawings is that of the well known commercial installation of a conveyor belt and traveling tripper. The conveyor belt 9 as indicated, may be driven in any suitable way. Grain may be supplied to the belt from any suitable point, as, for example, from the grain supply spout 23, shown only in Fig. 5. The tripper is, of course, arranged to travel along the rails so as to position its delivery spouts over the ports 8 of the bins into which the grain is to be delivered, this, as stated, being a well known action.

The application of my invention to a traveling tripper of the character above indicated, as illustrated in the drawings, is as follows: Mounted on the truck frame 16, one at each side of the hopper 18 is a fan or blower 24, the rotors of which are secured to a common transverse shaft 25, which, at its intermediate portion, has a pulley 26, upon which the loaded portion of the conveyor belt 9 is arranged to run and under sufficient friction for driving both fans.

From this it follows that the fans will be driven when and only when there is a load of grain on the conveyor belt. Otherwise stated, the fans will be driven intermittently according to whether or not there is a load of grain on the belt. This also gives an extremely simple, direct drive between the conveyor belt and the fans.

Secured on top of each inclined grain delivery spout 19 is a dust collector 27 preferably of the "cyclone" dust collector type provided in its top with a filter 28 for the escape of clean air. The hopper-like bottoms of these dust collectors 27 are connected by depending dust delivery spouts 29 to the extreme lower end portions of respective grain spouts 19. The discharge ports of the fans 24 are connected by dust-delivery spouts 30 to the respective dust collectors 27. Air suction spouts 31 are lead from the lower portions of the grain delivery spouts 19 to the eyes or intake ports of the respective fans 24.

By reference particularly to Fig. 4, it will be noted that an air suction spout 32 leads from the extreme upper portion of the hopper 18 to the eye or intake port of one of the fans 24, to wit: as shown, to the right-hand fan, as viewed in Fig. 2. By reference particularly to Figs. 2 and 4, it will be noted that there is located close to the upper pulley 22 and immediately below a grain entrance passage to the hopper 18, a hopper-like receiving end 33 of a dust suction spout 34 that leads to the eye or intake port of the other fan 24, to wit: to the left-hand fan, as viewed in Fig. 2.

*Operation*

When the conveyor belt and tripper are in action for the delivery of grain, the dust loosened from the grain and which, in the ordinary use of such apparatus, is discharged into the air of the room or building, will be picked up by the suction produced from the fans and delivered into the hoppers 27; and from the hoppers, the dust will be discharged at the extreme lower ends of the respective discharge spouts 19 and will go into the bins and be again commingled with the grain. Obviously, the dust will be picked up from all other places where dust is loosened from the grain and which points it could escape into the room, to wit: the dust is picked up from the hopper 18 at points both above and below the stream of grain that is being delivered into the hopper, and it is again picked up near the discharge ends of the respective delivery spouts 19. In the particular arrangement illustrated, the dust picked up from the upper portion of the hopper 18 is delivered through the right-hand fan 24 and into the right-hand dust collector 27, while the grain picked up from the lower portion of said hopper or from below the stream of grain entering the same, will be delivered through the left-hand dust collector 27. The amount of dust picked up from above and below the stream of grain entering the hopper 18 will be about the same amount and hence there will be about the same amount of dust in each dust collector. Suction from the spouts 31 will, of course, cause some of the dust delivered through the dust spouts 29 to be picked up and returned to the dust collector, but the greater amount of the dust delivered through the spouts 29 will go with the grain into the respective bins.

In this way, dust is prevented from escaping into the room or building and no work or attention is required to take care of the collected dust. The dust is simply returned into the grain within the bins and will be taken out of the grain later on in the customary way by means of cleaning and separating action which is necessary and would be necessary even if part of the dust were removed from the grain. The dust-collecting apparatus or attachment is shown as applied to a traveling tripper having a split or two-branch delivery spout, but of course, can be applied to trippers having but a single spout. However, the arrangement illustrated in connection with the split or two-branch delivery spout involves important novel features, for example, such as the arrangement whereby both of the fans are utilized in the dust-collecting action regardless of which of the delivery spouts is being used for the delivery of grain. This arrangement permits the use of relatively small fans or blowers.

From the foregoing, it is evident that other modifications may be made within the scope of the invention herein disclosed and claimed.

The above invention, while especially designed for use in connection with grain conveyors, may be used for various analogous purposes wherein it is desirable to remove dust from belt-conveyors, regardless of the material being handled; and hence while the term "grain conveyor" is herein used in the specification and claims, it is used as an illustrative manner and does not limit the invention to grain conveying belts or apparatus.

The feature of driving the fans or suction or blowing producing means from the conveyor belt that delivers the grain to the portable tripping device, is considered broadly new and is herein broadly claimed, and obviously, is an important feature since it eliminates the necessity of an independent motor or motors for driving the fan or blower.

What I claim is:

1. An apparatus for delivering grain and the like to bins, comprising a belt conveyor, a receiver encasing the discharge end of the belt conveyor having a chute into which the belt discharges its load for gravity flow into a bin, a suction fan mounted for operation adjacent said receiver, a dust conveying conduit connecting the upper end of said receiver with the suction side of said fan, and a dust collecting and pressure relieving means connected to the discharge side of said fan and delivering separated dust into said chute, whereby the dust is confined and delivered to a bin with the grain at substantially atmospheric pressure.

2. An apparatus for delivering grain and the like to rows of bins, comprising a belt conveyor, a tripper truck movable along said belt, a hopper on said truck encasing the discharge portion of said belt conveyor and having a chute into which the belt discharges its load for gravity flow into a desired bin, a suction fan on said truck, means for operating the fan by the loaded conveyor, dust conveying conduits connecting the upper and lower end portions of said chute with the suction side of said fan, and dust collecting means on said truck through which said fan discharges to the atmosphere, said last mentioned means having a conduit connected to the lower end portion of said chute for delivering separated dust to a bin at substantially atmospheric pressure.

3. An apparatus for delivering grain and the like to rows of bins, comprising a belt conveyor, a tripper truck movable along said belt conveyor, belt offsetting and guiding pulleys carried by said truck and having traveling engagement with the intermediate portion of said belt, a hopper on said truck encasing the discharge portion of said belt and having a chute into which the belt discharges its load for gravity flow into a desired bin, a suction fan on said truck, means for driving said fan when said conveyor belt is loaded comprising a pulley adapted to be engaged by a load carrying part of said belt, dust conveying conduits connecting the upper and lower end portions of said chute with the suction side of said fan, and dust collecting and pressure relieving means connected to the discharge side of said fan and delivering separated dust into the lower portion of said chute, whereby the dust is confined and delivered to a bin with the grain at substantially atmospheric pressure.

ARTHUR B. OSGOOD.